United States Patent
Yu (10) Patent No.: US 9,553,965 B2
(45) Date of Patent: Jan. 24, 2017

(54) METHOD AND DEVICE FOR NUMBER DISPLAY BASED ON MOBILE TERMINAL, AND MOBILE TERMINAL

(71) Applicant: ZTE CORPORATION, Shenzhen, Guangdong Province (CN)

(72) Inventor: Tieshuan Yu, Shenzhen (CN)

(73) Assignee: ZTE CORPORATION, Shenzhen, Guandong Province (CN)

( * ) Notice: Subject to any disclaimer, the term of this patent is extended or adjusted under 35 U.S.C. 154(b) by 0 days.

(21) Appl. No.: 14/652,047

(22) PCT Filed: Jul. 24, 2013

(86) PCT No.: PCT/CN2013/079990
§ 371 (c)(1),
(2) Date: Aug. 12, 2015

(87) PCT Pub. No.: WO2013/174334
PCT Pub. Date: Nov. 28, 2013

(65) Prior Publication Data
US 2016/0165030 A1    Jun. 9, 2016

(30) Foreign Application Priority Data

Dec. 14, 2012  (CN) .......................... 2012 1 0544235

(51) Int. Cl.
*H04M 1/56* (2006.01)
(52) U.S. Cl.
CPC ..................... *H04M 1/56* (2013.01)
(58) Field of Classification Search
CPC ...................................................... H04M 1/56
(Continued)

(56) References Cited

U.S. PATENT DOCUMENTS 6,289,226 B1 * 9/2001 Lekven ........... H04M 1/274566
455/414.1
8,243,915 B1    8/2012 Albuquerque
(Continued)

FOREIGN PATENT DOCUMENTS

CN     1653788 A     8/2005
CN     1968465 A     5/2007
(Continued)

OTHER PUBLICATIONS

International Search Report (Form PCT/ISA/210) for PCT/CN2013/079990 mailed Oct. 31, 2013.
(Continued)

*Primary Examiner* — Michael T Vu
(74) *Attorney, Agent, or Firm* — Koppel, Patrick, Heybl & Philpott (57) ABSTRACT

The disclosure provides a method and device for number display based on the mobile terminal and a mobile terminal. The method includes: an International Mobile Subscriber Identity, IMSI, automatic match function is enabled according to a user selection, IMSI information in a Subscriber Identity Module, SIM, card is read, the IMSI information is parsed to acquire Mobile Country Code, MCC, information; an MCC number format list is matched according to the MCC information to acquire and store a corresponding number display format; and when a user opens a dialling interface to input a number, the number is displayed according to the corresponding number display format. The disclosure solves the problem of not being adapted to a display style of the mobile terminal, and has the beneficial effects that an accustomed phone number display style of a corresponding country is automatically matched according to a phone number input by a user and the phone number is displayed according to the number display style, thereby
(Continued)

enhancing system performance and improving user experience.

16 Claims, 4 Drawing Sheets

(58) Field of Classification Search
USPC .................................................. 455/415–419
See application file for complete search history.

(56) References Cited

U.S. PATENT DOCUMENTS

2011/0116613 A1    5/2011  Aahlin
2012/0220281 A1*   8/2012  Chandan ................. H04W 8/26
                                                         455/418

FOREIGN PATENT DOCUMENTS

| CN | 101534499 A | 9/2009 |
| CN | 102769688 A | 11/2012 |
| CN | 103037058 A | 4/2013 |

OTHER PUBLICATIONS

European Search Report re: Application No./Patent No. 1379396.5-1972 / PCT/CN2013079990 dated Dec. 17, 2015.

* cited by examiner

METHOD AND DEVICE FOR NUMBER DISPLAY BASED ON MOBILE TERMINAL, AND MOBILE TERMINAL

TECHNICAL FIELD

The disclosure relates to the mobile terminal field, and in particular to a method and device for number display based on a mobile terminal, and a mobile terminal.

BACKGROUND

Since mobile terminals manufactured by the same mobile terminal manufacturer may be used by users in different countries or areas, and number display styles used by the users in different countries or areas are different; taking mobile phones for example, when the mobile phones of the same model are sold to many countries, and a user in each country inputs phone numbers in a dialling interface, a number display style is not necessarily an accustomed style of the user or an accustomed display style of a country where the user is.

For conforming to usage habits of the users, a method used by each mobile terminal manufacturer currently is: according to different countries to which the mobile terminals are sold and the different number display styles used by the users, producing different versions of mobile phone software, and customizing the number display styles adapting to different countries in the corresponding mobile phone software. But above method in the related art increases the cost of manufacturing the mobile terminal largely, and when the same mobile terminal, like a mobile phone, is switched from one user of one country to another user of another country for use, the problem of being unaccustomed to the display style still remains.

SUMMARY

The embodiments of the disclosure provides a method and device for number display based on a mobile terminal, in order to achieve the purpose that the same mobile terminal can automatically match a corresponding number display style according to the currently used Subscriber Identity Component (SIM) card.

The embodiments of the disclosure disclose a method for number display based on a mobile terminal including the following steps:

enabling an International Mobile Subscriber Identity (IMSI) automatic match function according to a user selection, reading IMSI information in an SIM card, parsing the IMSI information to acquire Mobile Country Code (MCC) information;

matching an MCC number format list is matched according to the MCC information to acquire and store a corresponding number display format; and when a user opens a dialling interface to input a number, displaying the number according to the corresponding number display format.

In an example embodiment, before enabling the IMSI automatic match function according to the user selection, reading the IMSI information in the SIM card, parsing the IMSI information to acquire the MCC information, the method further includes the following step:

presetting the MCC number format list.

In an example embodiment, the MCC number format list is stored in a form of configuration file or program code.

In an example embodiment, if the IMSI automatic match function is not enabled, or the IMSI automatic match function is enabled but the IMSI information in the SIM card is read as an abnormal IMSI sequence code, then the number is displayed according to a default number display format.

In an example embodiment, the MCC information and the number display format corresponding to the MCC information are stored in the MCC number format list.

The embodiments of the disclosure also disclose a device of number display based on a mobile terminal, which includes:

an information reading component configured to enable the IMSI automatic match function according to the user selection, read the IMSI information in the SIM card, parse the IMSI information to acquire the MCC information;

a format list matching component configured to match the MCC number format list according to the MCC information to acquire and store the corresponding number display format; and a number displaying component configured to, when the user opens the dialling interface to input a number, display the number according to the corresponding number display format.

In an example embodiment, the device for number display based on the mobile terminal further includes:

a format list setting component configured to preset the MCC number format list.

In an example embodiment, the MCC number format list is stored in a form of configuration file or program code.

In an example embodiment, the number displaying component is further configured to display the number according to the default number display format, if the information reading component does not enable the IMSI automatic match function, or the information reading component enables the IMSI automatic match function but the IMSI information in the SIM card is read as the abnormal IMSI sequence code.

In an example embodiment, the MCC information and the number display format corresponding to the MCC information are stored in the MCC number format list.

The embodiments of the disclosure also disclose a mobile terminal, which includes the device of number display based on the mobile terminal The device includes:

an information reading component configured to enable the IMSI automatic match function according to the user selection, read the IMSI information in the SIM card, parse the IMSI information to acquire the MCC information;

a format list matching component configured to match the MCC number format list according to the MCC information to acquire and store the corresponding number display format; and a number displaying component configured to, when the user opens the dialling interface to input a number, display the number according to the corresponding number display format.

In an example embodiment, the device of number display based on the mobile terminal further includes:

a format list setting component configured to preset the MCC number format list.

In an example embodiment, the MCC number format list is stored in a form of configuration file or program code.

In an example embodiment, the number displaying component is further configured to display the number according to the default number display format, if the information reading component does not enable the IMSI automatic match function, or the information reading component enables the IMSI automatic match function but the IMSI information in the SIM card is read as the abnormal IMSI sequence code.

In an example embodiment, the MCC information and the number display format corresponding to the MCC information are stored in the MCC number format list.

In the embodiment of the disclosure, the IMSI automatic match function is enabled according to the user selection, the IMSI information in the SIM card is read, the IMSI information is parsed to acquire the MCC information; the MCC number format list is matched according to the MCC information to acquire and store the corresponding number display format; and when the user opens the dialling interface to input a number, the number is displayed according to the corresponding number display format. The embodiment of the disclosure has the beneficial effects that the accustomed phone number display style of the corresponding country is automatically matched according to the phone number input by the user and the number is displayed according to the number display style, thereby enhancing system performance and improving user experience.

The implementation, function features and advantages of the disclosure will be further illustrated in combination with embodiments and the accompanying drawings.

DETAILED DESCRIPTION OF EMBODIMENTS

The technical solution of the disclosure will be described hereinafter in detail with reference to the drawings and in conjunction with embodiments. It should be appreciated that the embodiments described herein are merely illustrative of the disclosure but not to be construed as limiting the disclosure.

Figure 1:
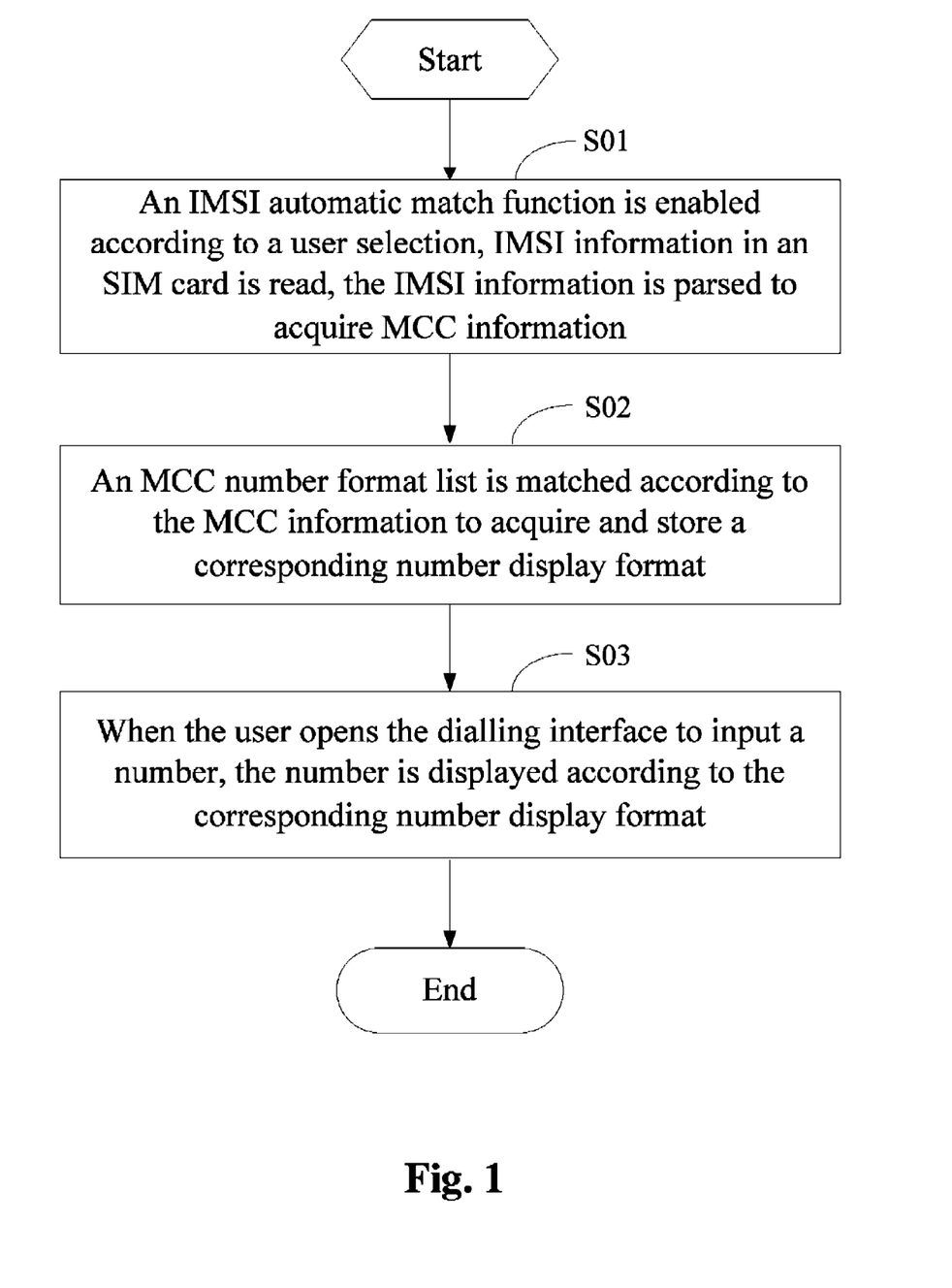
FIG. 1 is a flowchart of a method for number display based on a mobile terminal according to an embodiment of the disclosure.

FIG. 1 is a flowchart of a method for number display based on a mobile terminal according to an embodiment of the disclosure; as shown in FIG. 1, the method for number display based on the mobile terminal of the disclosure includes the following steps.

Step S01: An IMSI automatic match function is enabled according to a user selection, IMSI information in an SIM card is read, the IMSI information is parsed to acquire MCC information;

after a user inputs a number, the mobile terminal first queries corresponding settings, and judges whether the user has selected to enable a function of automatically matching a phone number display style according to the IMSI information; if the function is not enabled, then the mobile terminal displays a phone number input by the user directly according to a default display style; if the function is enabled, then the mobile terminal enables the IMSI automatic match function according to the user selection, and reads the IMSI information in the SIM card.

Since the IMSI information is a number assigned for uniquely identifying a mobile subscriber internationally, it is a mark for differentiating the mobile subscriber and stored in the SIM card, it is effective information which can be used for differentiating mobile subscribers. The total length of a IMSI number does not exceed 15 digits, and the IMSI number uses numbers from 0 to 9 to identity, for example, a typical IMSI number is 460030912121001; a structure of a IMSI is: MCC+Mobile Network Code (MNC)+Mobile Subscriber Identification Number (MSIN); wherein the MCC is a code of a country to which the mobile subscriber belongs, including 3 numbers; the MNC is a mobile network number, which is composed of two numbers at most and used for identifying a mobile communication network to which the mobile subscriber belongs, for example, the system of China Mobile uses 00, 02 and 07, the Global System for Mobile Communications (GSM) system of China Unicom uses 01, and the Code Division Multiple Access (CDMA) system of China Telecom uses 03; the MSIN is a mobile subscriber identification number, which is composed of 10 numbers and used for identifying the mobile subscriber in a certain mobile communication network.

There may be three results when the mobile terminal reads the IMSI information in the SIM card inserted currently: it is a normal IMSI sequence code; it is failed to read the IMSI sequence code or an invalid IMSI sequence code is read; the SIM card is not read; for the latter two results, the mobile terminal displays the number input by the user in the dialling interface according to the default number display format; for the first result, namely the normal IMSI sequence code, the mobile terminal continues to parse the IMSI sequence code, and acquires the MCC in the IMSI sequence code.

Step S02: An MCC number format list is matched according to the MCC information to acquire and store a corresponding number display format;

Since the MCC information of the IMSI sequence code represents the MCC of the current SIM card, the MCC resource is assigned and managed by a International Telecommunication Union (ITU) in a unified way, and uniquely identifies the country to which the mobile subscriber belongs, for example, the MCC of China is specified as 460. Because the MCC number format list is pre-stored in the mobile terminal, and the MCC information and the accustomed number display style of a corresponding country are stored in the MCC number format list, the MCC number format list can be automatically matched according to the MCC information, thereby confirming a corresponding display format of the number input in the dialling interface of the mobile terminal, and storing the display format to the mobile terminal Step S03: When the user opens the dialling interface to input a number, the number is displayed according to the corresponding number display format.

Because it is determined in Step S02 that the mobile terminal displays the number input by the user in the dialling interface according to which country's style, when the user opens the dialling interface to input the number, the mobile terminal displays the corresponding number according to the corresponding number display format; examples of the accustomed number display styles of different countries are shown in the following table.

| Country | Number display style |
| --- | --- |
| China | XXXXXXXXXXX |
| America | XXX-XXX-XXXX |
| North Korea | XXX-XXXX-XXXX |
| South Korea | XXX-XXXX-XXXX |
| Japan | XXX-XXXX-XXXX |

The number display styles corresponding to countries listed in the above table are only shown as examples, but not intended to limit the protection scope of the present embodiment. Because the MCC number and the corresponding number display style of each country in the world are stored in the MCC number format list of the mobile terminal, the skilled person in the art can understand, and there is no need to enumerate in the present embodiment.

In the present embodiment, the IMSI automatic match function is enabled according to the user selection, the IMSI information in the SIM card is read, the IMSI information is parsed to acquire the MCC information; the MCC number format list is matched according to the MCC information to acquire and store the corresponding number display format; and when the user opens the dialling interface to input a number, the number is displayed according to the corresponding number display format, the disclosure has the beneficial effects that the accustomed phone number display style of the corresponding country is automatically matched according to the phone number input by the user and the number is displayed according to the number display style, thereby enhancing system performance and improving user experience.

Figure 2:
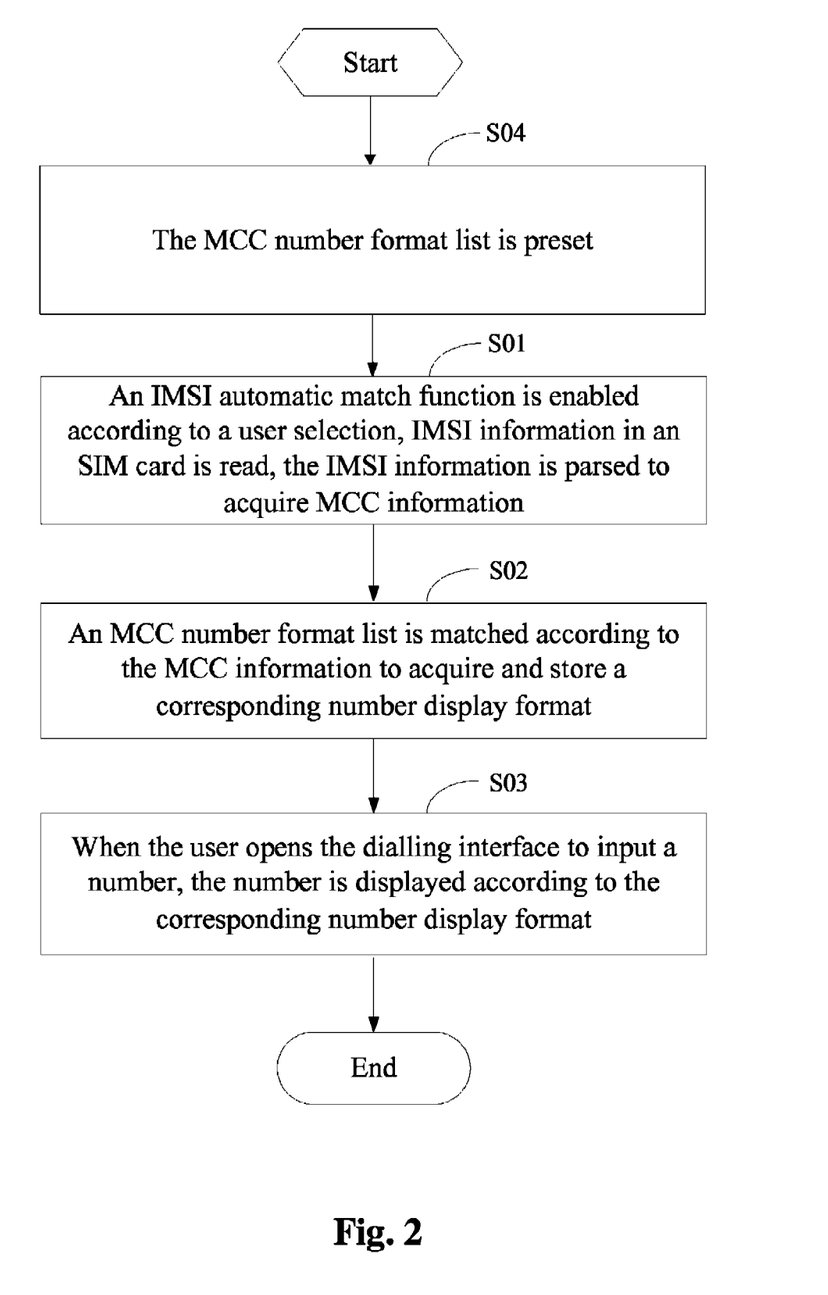
FIG. 2 is a flowchart of a method for number display based on a mobile terminal according to another embodiment of the disclosure.

As shown in FIG. 2, FIG. 2 is a flowchart of a method for number display based on a mobile terminal-based number display method according to another embodiment of the disclosure; the difference between the present embodiment and the embodiment as shown in FIG. 1 is only adding Step S04; the present embodiment only describes Step S04 in detail, and other steps involved in the method for number display based on the mobile terminal of embodiments of the disclosure refer to the specific description of the embodiment as shown in FIG. 1, so they will not be repeated here.

As shown in FIG. 2, before Step S01, namely the IMSI automatic match function is enabled according to the user selection, the IMSI information in the SIM card is read, the IMSI information is parsed to acquire the MCC information, the method for number display based on the mobile terminal of the embodiments of the disclosure further includes:

Step S04: The MCC number format list is preset.

Because the MCC information is a code of the country to which the mobile subscriber belongs, which uniquely identifies the country to which the mobile subscriber belongs, the accustomed number display style of the country corresponding to the MCC information and the MCC information can be stored in the MCC number format list by a one-to-one mapping way, and the MCC number format list is pre-stored in the mobile terminal; thus, when the mobile terminal acquires the MCC information in the SIM card used by the user currently, the accustomed number display style of the corresponding country can be acquired by automatically matching the MCC number format list. The MCC numbers of all countries in the world and the accustomed number display style of the country corresponding to each MCC are stored in the MCC number format list.

In an example embodiment, the MCC number format list is stored in the mobile terminal in a form of configuration file or program code.

The method of presetting the MCC number format list in the disclosure is an important prerequisite of automatically matching the accustomed number display style of the corresponding country according to the MCC information and displaying the number according to the corresponding display style.

Figure 3:
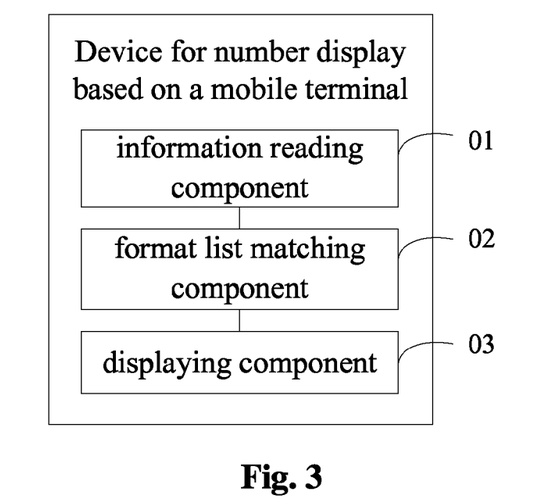
FIG. 3 is a structural diagram of a device for number display based on a mobile terminal according to an embodiment of the disclosure.

FIG. 3 is a structural diagram of a device of number display based on a mobile terminal according to an embodiment of the disclosure; as shown in FIG. 3, the device for number display based on the mobile terminal of the embodiments of the disclosure includes: a information reading component 01, a format list matching component 02 and a number displaying component 03.

The information reading component 01 is configured to enable the IMSI automatic match function according to the user selection, read the IMSI information in the SIM card, parse the IMSI information to acquire the MCC information;

after the user inputs the number, the information reading component 01 in the mobile terminal first queries corresponding settings, and judges whether the user has selected to enable the function of automatically matching the phone number display style according to the IMSI information; if the function is not enabled, then the number displaying component 03 displays a phone number input by the user directly according to a default display style; if the function is enabled, then the information reading component 01 enables the IMSI automatic match function according to the user selection, and reads the IMSI information in the SIM card.

Since the IMSI information is a number assigned for uniquely identifying a mobile subscriber internationally, it is a mark for differentiating the mobile subscriber and stored in the SIM card, it is effective information which can be used for differentiating the mobile subscribers. The total length of a IMSI number does not exceed 15 digits, and the IMSI number uses numbers from 0 to 9 to identity, for example, a typical IMSI number is 460030912121001; a structure of a IMSI is: MCC+MNC+MSIN; wherein the MCC is a code of a country to which the mobile subscriber belongs, including 3 numbers; the MNC is a mobile network number, which is composed of two numbers at most and used for identifying a mobile communication network to which the mobile subscriber belongs, for example, the system of China Mobile uses 00, 02 and 07, the GSM system of China Unicom uses 01, and the CDMA system of China Telecom uses 03; the MSIN is a mobile subscriber identification number, which is composed of 10 numbers and used for identifying the mobile subscriber in a certain mobile communication network.

There may be three results when the information reading component 01 reads the IMSI information in the SIM card inserted currently: it is a normal IMSI sequence code; it is failed to read the IMSI sequence code or an invalid IMSI sequence code is read; the SIM card is not read; for the latter two results, the number displaying component 03 displays the number input by the user in the dialling interface according to the default number display format; for the first result, namely the normal IMSI sequence code, the information reading component 01 continues to parse the IMSI sequence code, and acquires the MCC in the IMSI sequence code.

The format list matching component 02 is configured to match an MCC number format list according to the MCC information to acquire and store the corresponding number display format;

Since the MCC information of the IMSI sequence code represents the MCC of the current SIM card, the MCC resource is assigned and managed by a ITU in a unified way, and uniquely identifies the country to which the mobile subscriber belongs, for example, the MCC of China is specified as 460. Since the MCC number format list is pre-stored in the mobile terminal, and the MCC information and the accustomed number display style of the corresponding country are stored in the MCC number format list, the format list matching component 02 can automatically match the MCC number format list according to the MCC information, thereby confirming the corresponding display format of the number input in the dialling interface of the mobile terminal, and storing the display format to the mobile terminal.

The number displaying component 03 is configured to display the number according to the corresponding number display format when the user opens the dialling interface to input a number.

Because the format list matching component 02 has determined that the mobile terminal displays the number input by the user in the dialling interface according to which country's style, when the user opens the dialling interface to input the number, the number displaying component 03 of the mobile terminal displays the corresponding number according to the corresponding number display format; examples of the accustomed number display styles of different countries are shown in the following table.

| Country | Number display style |
|---|---|
| China | XXXXXXXXXXX |
| America | XXX-XXX-XXXX |
| North Korea | XXX-XXXX-XXXX |
| South Korea | XXX-XXXX-XXXX |
| Japan | XXX-XXXX-XXXX |

The number display styles corresponding to countries listed in the above table are only shown as examples, but not intended to limit the protection scope of the present embodiment. Because the MCC number and the corresponding number display style of each country in the world are stored in the MCC number format list of the mobile terminal, the skilled person in the art can understand, and there is no need to enumerate in the embodiment.

In the present embodiment, the IMSI automatic match function is enabled according to the user selection, the IMSI information in the SIM card is read, the IMSI information is parsed to acquire the MCC information; the MCC number format list is matched according to the MCC information to acquire and store the corresponding number display format; and when the user opens the dialling interface to input a number, the number is displayed according to the corresponding number display format, the disclosure has the beneficial effects that the accustomed phone number display style of the corresponding country is automatically matched according to the phone number input by the user and the number is displayed according to the number display style, thereby enhancing system performance and improving user experience.

Figure 4:
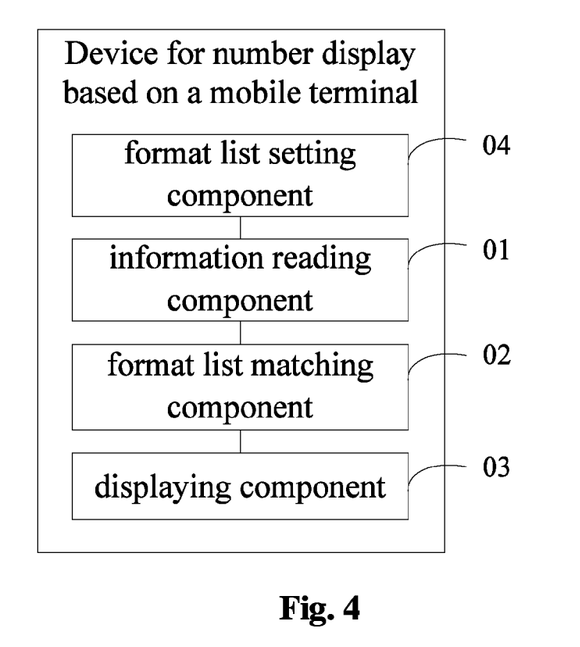
FIG. 4 is a structural diagram of a device for number display based on a mobile terminal according to another embodiment of the disclosure.

As shown in FIG. 4, FIG. 4 is a structural diagram of a device of number display based on a mobile terminal according to another embodiment of the disclosure; the difference between the present embodiment and the embodiment as shown in FIG. 3 is only adding a format list setting component 04; the present embodiment only describes the format list setting component 04 in detail, and other components involved in the device for number display based on the mobile terminal of embodiments of the disclosure refer to the specific description of related embodiments, so they will not be repeated here.

As shown in FIG. 4, the device of number display based on the mobile terminal of embodiments of the disclosure further includes:

a format list setting component 04, which is configured to preset the MCC number format list.

Because the MCC information is a code of the country to which the mobile subscriber belongs, which uniquely identifies the country to which the mobile subscriber belongs, the format list setting component 04 can store the accustomed number display style of the country corresponding to the MCC information and the MCC information in the MCC number format list by a one-to-one mapping way, and pre-store the MCC number format list in the mobile terminal; thus, when the information reading component 01 acquires the MCC information in the SIM card used by the user currently, the accustomed number display style of the corresponding country can be acquired by automatically matching the MCC number format list through the format list matching component 02. The MCC numbers of all countries in the world and the accustomed number display style of the country corresponding to each MCC are stored in the MCC number format list.

In an example embodiment, the MCC number format list is stored in the mobile terminal in the form of configuration file or program code.

The method of presetting the MCC number format list in the disclosure is an important prerequisite of automatically matching the accustomed number display style of the corresponding country according to the MCC information and displaying the number according to the corresponding display style.

Figure 5:
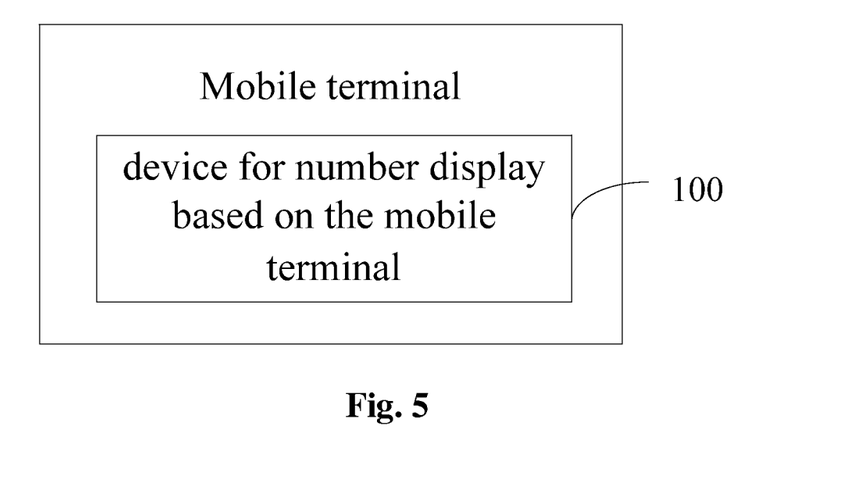
FIG. 5 is a structural schematic diagram of a mobile terminal according to an embodiment of the disclosure.

FIG. 5 is a structural schematic diagram of the mobile terminal according to an embodiment of the disclosure. As shown in FIG. 5, the mobile terminal of the embodiments of the disclosure includes a device for number display based on the mobile terminal 100. The specific description of the device of number display based on the mobile terminal 100 refers to the specific description of the above embodiments, so it will not be repeated here. The mobile terminal of the embodiments of the disclosure is equipped with the dialling interface for a user to input a number.

In the present embodiment a IMSI automatic match function is enabled according to the user selection, a IMSI information in the SIM card is read, a IMSI information is parsed to acquire a MCC information; a MCC number format list is matched according to the MCC information to acquire and store a corresponding number display format; and when the user opens the dialling interface to input a number, the number is displayed according to the corresponding number display format, the disclosure has the beneficial effects that the accustomed phone number display style of the corresponding country is automatically matched according to the phone number input by the user and the number is displayed according to the number display style, thereby enhancing system performance and improving user experience.

Above description is only to illustrate the example embodiments but not to limit the scope of the disclosure; and the direct or indirect application of any equivalent structure or equivalent flow devised as defined by the description and accompanying drawings of the disclosure to other related fields should also fall within the protection scope of the disclosure.

INDUSTRIAL APPLICABILITY

As mentioned above, a method and device for number display based on a mobile terminal provided by the embodiments of the disclosure have the following beneficial effects: a accustomed phone number display style of a corresponding country is automatically matched according to a phone number input by a user and the phone number is displayed according to the number display style, thereby enhancing system performance and improving user experience.

What is claimed is:

1. A method for number display based on a mobile terminal, comprising:
enabling an International Mobile Subscriber Identity, IMSI, automatic match function according to a user selection, reading IMSI information in a Subscriber Identity Module, SIM, card, parsing the IMSI information to acquire Mobile Country Code, MCC, information;
matching an MCC number format list according to the MCC information to acquire and store a corresponding number display format; and
when a user opens a dialing interface to input a number, displaying the number according to the corresponding number display format;
wherein before enabling the IMSI automatic match function according to the user selection, reading the IMSI information in the SIM card, parsing the IMSI information to acquire the MCC information, the method further comprises:
presetting the MCC number format list.

2. The method according to claim 1, wherein the MCC number format list is stored in a form of configuration file or program code.

3. The method according to claim 2, wherein the MCC information and the number display format corresponding to the MCC information are stored in the MCC number format list.

4. The method according to claim 1, wherein if the IMSI automatic match function is not enabled, or the IMSI automatic match function is enabled but the IMSI information in the SIM card is read as an abnormal IMSI sequence code, then the number is displayed according to a default number display format.

5. The method according to claim 1, wherein the MCC number format list is stored in a form of configuration file or program code.

6. A device for number display based on a mobile terminal, comprising:
an information reading component, configured to enable an International Mobile Subscriber Identity, IMSI, automatic match function according to a user selection, read IMSI information in a Subscriber Identity Module, SIM, card, parse the IMSI information to acquire Mobile Country Code, MCC, information;
a format list matching component, configured to match an MCC number format list according to the MCC information to acquire and store a corresponding number display format; and
a number displaying component, configured to, when a user opens a dialing interface to input a number, display the number according to the corresponding number display format;
wherein before enabling the IMSI automatic match function according to the user selection, reading the IMSI information in the SIM card, parsing the IMSI information to acquire the MCC information, the method further comprises:
presetting the MCC number format list.

7. The device according to claim 6, further comprising:
a format list setting component, configured to preset the MCC number format list.

8. The mobile terminal, comprising the device for number display based on a mobile terminal according to claim 7.

9. The device according to claim 6, wherein the MCC number format list is stored in a form of configuration file or program code.

10. The device according to claim 9, wherein the MCC information and the number display format corresponding to the MCC information are stored in the MCC number format list.

11. The mobile terminal, comprising the device for number display based on a mobile terminal according to claim 10.

12. The mobile terminal, comprising the device for number display based on a mobile terminal according to claim 9.

13. The device according to claim 6, wherein the number displaying component is further configured to display the number according to a default number display format, if the information reading component does not enable the IMSI automatic match function, or the information reading component enables the IMSI automatic match function but the IMSI information in the SIM card is read as an abnormal IMSI sequence code.

14. The mobile terminal, comprising the device for number display based on a mobile terminal according to claim 13.

15. The mobile terminal, comprising the device for number display based on a mobile terminal according to claim 6.

16. The device according to claim 6, wherein the MCC number format list is stored in a form of configuration file or program code.

* * * * *